W. L. PATTERSON.
OPTICAL PROJECTION APPARATUS.
APPLICATION FILED MAY 22, 1917.
1,365,599.  
Patented Jan. 11, 1921.  
2 SHEETS—SHEET 1.
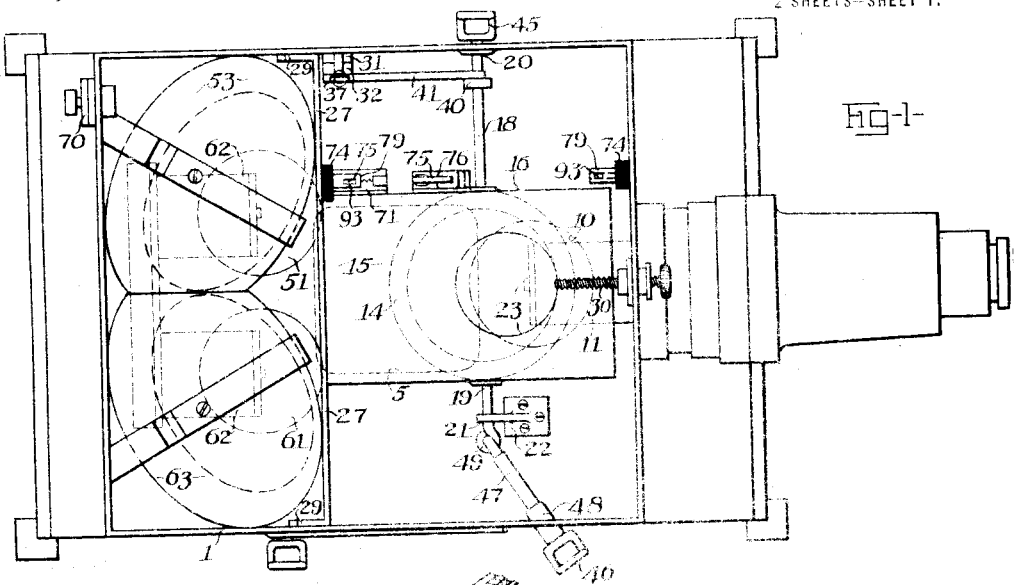
Fig-1-
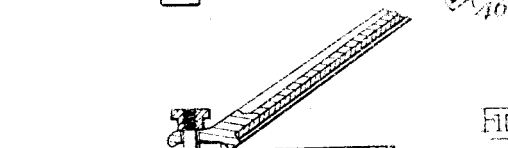
Fig-2-
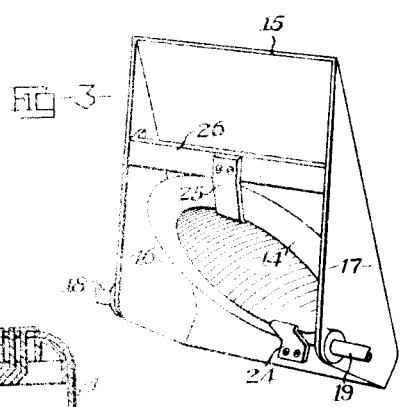
Fig-3-
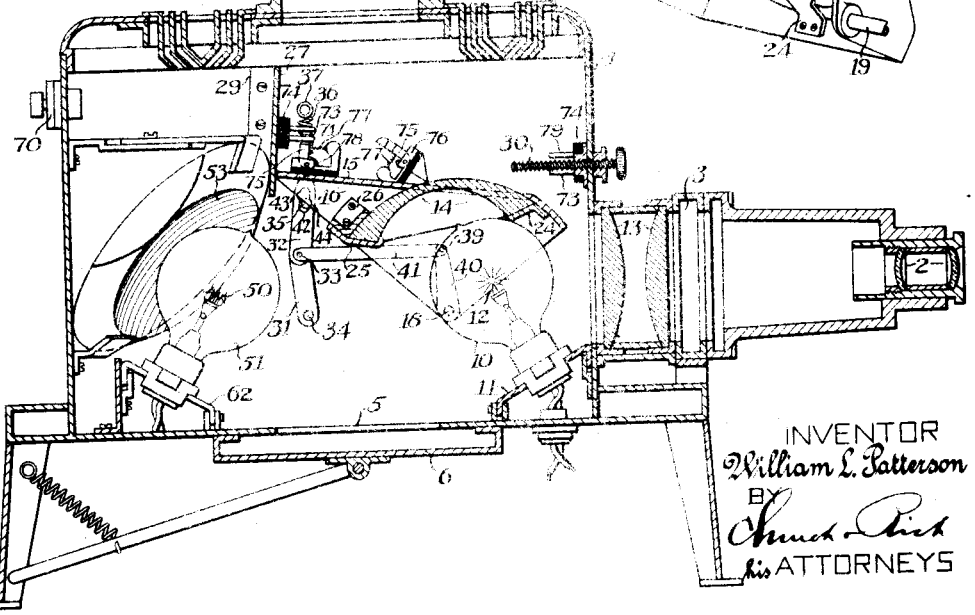
INVENTOR  
William L. Patterson  
BY  
his ATTORNEYS

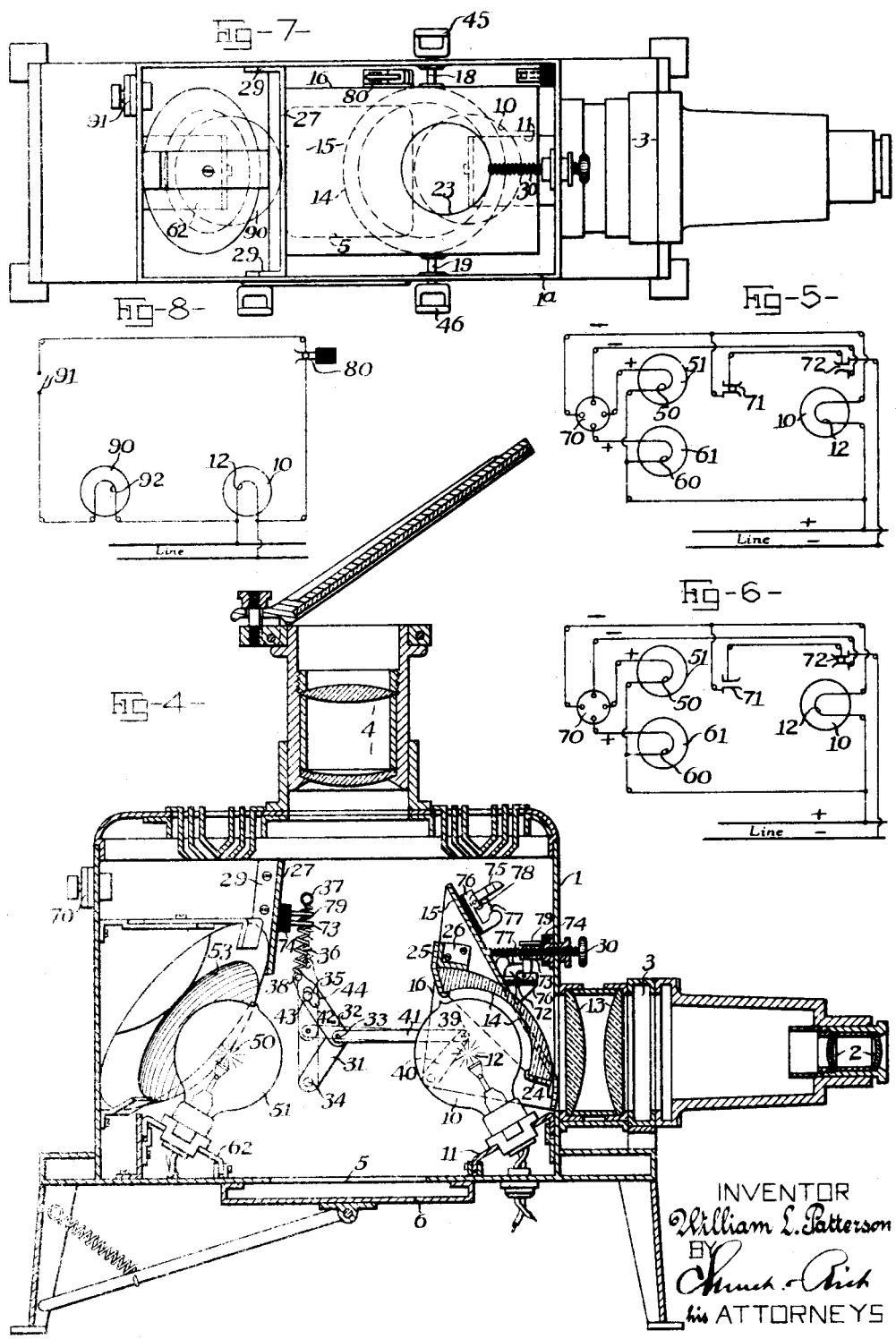

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

OPTICAL PROJECTION APPARATUS.

1,365,599.  Specification of Letters Patent.  Patented Jan. 11, 1921.

Application filed May 22, 1917. Serial No. 170,274.

*To all whom it may concern:*

Be it known that I, WILLIAM L. PATTERSON, a citizen of the United States, residing at Rochester, in the county of Monroe, State of New York, have invented certain new and useful Improvements in Optical Projection Apparatus; and I do declare the following to be a full, clear, and exact description of the same, reference being had to the accompanying drawings, forming a part of this specification, and to the characters of reference marked thereon.

This invention relates to apparatus for projecting images of either transparent or opaque objects and comprehends an apparatus so organized that it is adapted to project either class of objects with the same facility and efficiency as a single apparatus especially designed to project either type of object alone. Other objects of the invention are the provision of: a simple and efficient apparatus adapted to dissolve the image produced by either transparent or opaque projection into an image produced respectively by opaque or transparent projection through the medium of a shutter movable about a light source; an illuminating system for projection apparatus wherein the light source is located in close proximity both to the transparent projection system and to the opaque object to be illuminated; an illuminating system for projection apparatus adapted to illuminate a transparent object efficiently and economically and adapted to illuminate the opaque object in such a manner as to either increase, modulate or decrease the contrast of portions of the projected image of the opaque object.

In the drawings: Figure 1 is a plan view of a projection apparatus embodying features of this invention, the top of the lamp house having been removed to disclose the parts within arranged in position to adapt the apparatus to transparent projection; Fig. 2 is a vertical sectional elevation of the apparatus shown in Fig. 1 taken through a plane common to the optical axis of both of the projection objectives and with the lamp house top applied thereon and with the parts likewise relatively adjusted for transparent projection; Fig. 3 is a perspective detail view of the dissolving movable shutter carrying a reflector; Fig. 4 is a vertical section taken in the same plane as Fig. 2, and showing the parts relatively adjusted for opaque projection; Figs. 5 and 6 are wiring diagrams of the apparatus illustrated in Figs. 1 to 4 inclusive, showing the electrical connections when the parts of the apparatus occupy relative positions shown in Figs. 2 and 4 respectively; Fig. 7 is a plan view of a modified apparatus with the lamp house top removed, and including only two light sources, and Fig. 8 is a wiring diagram for the apparatus illustrated in Fig. 7.

In a mounting held to the front of the lamp house or casing 1 of this projection apparatus is held an objective 2 for projecting an image of an illuminated transparent object properly placed in the transparent object holder 3, and on the lamp house top is mounted an objective 4 for projecting an image of an illuminated opaque object properly held in place in the bottom casing aperture 5 by the opaque object support 6. In the lamp house is arranged an illuminating system for illuminating either the opaque or the transparent object or both of them.

This illuminating system may embody a single light source alone, which preferably is provided by an incandescent electric lamp 10 mounted on the adjustable stationary support 11 with its concentrated filament 12 simultaneously in the focus of the condensing lens system 13 to project an illuminating beam of light through the transparent object holder and into the objective 2, and in position to illuminate the area of the opaque object aperture 5.

The lamp 10 is arranged as close as possible to the object aperture 5 without obstructing the light path to the objective 4, and the focus of the condensing system 13 is long enough to provide a space between the lamp 10 and the adjacent lens of the condensing system to permit interposition of means for directing the light rays comprising the combined concave reflector 14 and its carrier 15 which are movable into position between the lamp 10 and the condensing system, as shown in Fig. 4, to throw a beam of light from the filament 12 over the area of the opaque object aperture 5. This beam of light while preferably parallel may be divergent or even slightly convergent. The reflector 14 when in this position functions to augment and equalize the illumination of the object aperture 5 by the lamp 10, and with its carrier 15 shuts off all light from the transparent projection system which includes the condensing lenses 13 and the objective 2. The reflector carrying shutter 14, 15, is also movable from the position in which it is shown in Fig. 4 to a position in which it may obstruct the passage of light from the opaque object aperture 5 through the objective 4, while opening the path of light through the transparent projection system 13, 2.

In order that it may be feasible to employ as small a concave reflector 14 as possible and in order that the path of movement of the shutter may be minimized, the carrier 15 is extended in front and rear of the reflector 14 in the direction of movement to assist the reflector proper in obstructing the light path through the transparent projection system or the light path through the opaque projection system. Accordingly in practice, I employ the movable reflector carrying shutter 14—15 which includes two side walls 16 and 17, and is mounted within the casing 1 as well shown in Figs. 1, 2 and 4, to be pivotally movable about the axis of the alined shaft portions 18 and 19 fixed to the shutter walls 16, 17, and respectively journaled at 20 in a side wall of the casing and at 21 in a bracket 22 fixed to the casing floor. The concave reflector 14, which in the present embodiment is a Mangin mirror, is held between the shutter side walls 16, 17, and in a seating aperture 23 formed in the shutter back wall which is more especially marked 15, and by means of a lower cleat 24 secured to the lower portion of the wall 15, and an upper cleat 25 secured to a bar 26 extending between and fastened to the shutter side walls 16, 17. The lower forward end of the shutter wall 15 is extended downward and inward beyond the periphery of the reflector 14 to assure that said extended wall portion and the reflector itself shall exclude the lamp's light from the condensing system 13 and the objective 2 when the shutter is forwardly adjusted as shown in Fig. 4 of the drawings.

A substantially vertical narrow partition wall 27 extends transversely across the upper portion of the casing 1 in rear of the path of light intermediate the opaque object aperture 5 and its objective 4, and may be secured to the casing side walls by flanges 29. When the reflecting shutter is moved from the position it occupies in Fig. 4 to the position shown in Fig. 2, the rear edge of the shutter wall 15 impinges against the partition wall 27, which acts as a stop to arrest movement of the shutter in a rearward direction and the coacting reflector 14, and its carrier 15 then exclude the lamp's light from the objective 4 of the opaque projection system.

For arresting movement of the reflecting shutter in the other direction and for properly positioning its reflector 14 relatively to the lamp 10 when the shutter is in the position shown in Fig. 4 for illuminating an opaque object, an adjustable stop 30 is fitted in the casing front wall in position to be struck by the shutter back wall.

The center of mass of the reflecting shutter 14, 15, when it is in the position shown in Fig. 4, is situated well to the right of its center of oscillation, and when the shutter is swung over rearward to the position shown in Fig. 2, its center of mass is slightly to the left of its center of oscillation, and therefore the reflecting shutter will remain in whichever of the two positions into which it is manually adjusted. In order to balance the mass of the moving reflecting shutter and certain circuit breaker parts mounted thereon, I may provide a counterbalance of any well known form, but it is preferred to employ a spring resistance counterbalance coordinated to the different moments of mass of the shutter through a crank and toggle links. This counterbalance is practically without inertia or momentum and has the further advantage of being adapted to yieldingly lock the reflecting shutter in either of its two operative positions.

The spring resistance counterbalance is illustrated in Figs. 1, 2 and 4, and comprises a pair of toggle levers 31 and 32 hinged together by a pin 33, the lower end of the lever 31 being pivoted by a stud 34 to a stationary support such as the adjacent wall of the casing 1, and the upper end of the lever 32 being vertically slotted and slidably pivoted at said slot on a fixed stud 35 which may be secured to the adjacent wall of the casing 1. A tension spring 36 is anchored to a stud 37 fixed to the casing 1, and is also connected to the upper end of the toggle lever 32 at 38, and tends to keep the lever arms of the toggle straightened or alined with each other, as shown in dotted lines in Fig. 4, and thus resists bending of the toggle in either direction. The studs 34 and 35, are preferably arranged in a vertical line and a crank pin 39, which is secured to the free end of a crank arm 40 shown fixed to the shutter pivot shaft 18, is coupled by a link 41 to the toggle lever coupling pin 33. The link 41 has such length that when the center of mass of the reflecting shutter 14—15 is vertically above its center of oscillation the toggle levers 31, 32 will be in their dotted center or extended position. Thus it will be seen that when the reflecting shutter is swung to the forward position in which it is shown in Fig. 4, the resistance offered by the toggle levers and spring 36, then increasing with the leverage of the center of mass of the shutter, will counterbalance the shutter when it is moved in this direction, and when the shutter is oppositely swung rearward from the position shown in Fig. 4 to the position shown in Fig. 2, the toggle levers and the spring will counterbalance it on its return movement to the normal center of balance when the center of mass is vertically over the center of oscillation and will also counterbalance it on the other side of the center of balance. If it is desired to yieldingly lock the reflecting shutter in position at both ends of its movement it is only necessary to provide the slot 42 in the lever 32 with two side wall depressions or notches 43 and 44 which are respectively adapted to engage the fixed stud 35 to yieldingly lock the shutter in either of the positions in which it is shown in Figs. 2 and 4 of the drawings. For moving the reflecting shutter 14—15 about its pivotal axis from either side of the apparatus the handles 45 and 46 are provided, the handle 45 being mounted on the outer end of the shaft 18, and the handle 46, as shown in Fig. 1, being mounted on the outer end of a diagonally disposed shaft 47 journaled at 48 in the casing wall and flexibly connected to the shaft 19 by a universal joint 49. In the modified apparatus shown in Fig. 7, the handle 46 is fixed directly to the shutter pivot shaft 19.

With the instrument constructed as thus far described, a transparent object such as a lantern slide placed in the holder 3, and an opaque object such as a photograph held against the opaque aperture 5 by the holder 6, one or the other, may be selectively projected, presuming illumination to be furnished by the lamp 10 alone, by the simple act of turning either of the handles 45 or 46 to shift the reflecting shutter 14—15 from the position shown in Fig. 2 to that shown in Fig. 4, or vice versa. Thus with the shutter occupying the position shown in Fig. 2, transparent objects may be projected and exhibited upon a screen, and when the shutter is shifted from the position shown in Fig. 2 to that shown in Fig. 4, the image of the transparent object projected through the transparent projection system gradually will be dissolved into the image of the opaque object placed in the aperture 5 and projected through the opaque projection system, and vice versa, when the shutter is next returned to the position shown in Fig. 2, the image of the opaque object last projected will be dissolved into the image of the transparent object placed in the holder 3 and projected through the transparent projection system.

In projecting a large diversity of opaque objects some of them flat having a smooth surface, others solid having a rough surface, some contrasting in effect and others flat and weak, and in adjusting the illumination of the opaque object relatively to that of the transparent object, it has been found desirable to manipulate the illumination of the opaque object. To this end the apparatus illustrated in Figs. 1 to 6 inclusive provides means for illuminating the opaque object from a plurality of directions selectively or simultaneously, and comprehends an addition to the main lamp 10 and apparatus as thus far described of the light sources 50 and 60 arranged on the opposite side of the aperture 5 to that at which the light source 12 is placed. The light sources 50 and 60 are preferably provided by the filaments of two incandescent electric lamps 51 and 61 individually mounted on one of a pair of laterally adjustable base supports 62 and each provided with a reflector such as the Mangin mirrors 53 and 63 which are adjustably mounted behind their respective light sources 50 and 60 to reflect from each of these light sources a beam of light inclining toward and uniformly covering the entire area of the object aperture 5. It will be apparent that lamps 61 and 62 when operative are substantially screened from the transparent object holder. As with the lamp 10, the lamps 51 and 61 are placed as close to the aperture 5 as is possible without obstructing the light path between the object aperture 5 and the opaque projection objective 4. Lamps 61 and 62 are shown in Fig. 1 as being a different distance from the center of the opaque object holder than is lamp 10 whereby the opaque object is better illuminated than if the lamps 10 and 61 for example were directly opposite one another.

Provision is made in this apparatus for automatically cutting out or extinguishing all of the lamps excepting 10 when transparent projection is attempted, for since this lamp 10 alone is adapted to furnish illumination to the condensing lenses 13, it will be seen that not only would the light produced by the remaining lamps be useless and thus involve waste of electrical energy but what is worse, direct light falling from them on the condensing lenses 13 would be liable to destroy the uniform illumination of the image projected on the screen by the objective 2. Provision is also made when using the apparatus for opaque projection, for selectively lighting any one lamp, or any combination of the lamps 10, 51, 61, to assure special illumination of various parts of the object itself, in order to produce the most desirable effect on the brilliancy of the image of the opaque object. If it is desired to use the lamp 10 alone, for projecting opaque objects alone, or for alternately projecting transparent and opaque objects as might be the case when autochrome slides are to be projected alternately with pen and ink drawings or diagrams as opaque objects, the circuit controlling switch 70 shown in Figs. 5 and 6, may be turned to cut out the lamps 51, 61, leaving in circuit the lamp 10 alone. If a somewhat greater illumination of the opaque object relative to the transparent object is desired, the switch 70 may be turned to such a position that either of the lamps 51 or 61 will be cut off altogether and the lamps 10 and either 51 or 61 will be selectively lighted. Thus the lamp 10 may be used alone when transparent projection is attempted, and either lamp 51 or 61 may be used with the lamp 10 when opaque projection is attempted. The substitution of one light source for another is automatically effected by the circuit breakers 71 and 72 hereinafter described. Furthermore, illumination from lamps 51 and 61 may be substituted for illumination from the lamp 10 at the same time that transparent projection is dissolved into opaque projection by the movement of the reflecting shutter 14—15, the circuit breakers 71 and 72 operating to effect this change, or if desired all three lamps simultaneously may be used for illuminating the opaque object to be projected while the lamp 10 alone is used for illuminating the transparent projection system.

To those experienced in the projection of various kinds of transparent objects and a large variety of opaque objects, plane and solid, by the same instrument, the ability to manipulate the illumination in the manner provided for in the herein described projector, will appeal strongly. It is obvious that when the object lends itself particularly well to be illuminated from above alone or from below alone, this may be done, and if on the other hand it is desired to illuminate it from a corner this may also be done, and thus by selecting that one of the three light sources 10, 51 or 61 best adapted to illuminate the object from a single direction, the desired illumination may be obtained. If while using the lamp 51 for illuminating an opaque object the illumination should be insufficient and should a strongly contrastive illumination be desirable or necessary, such insufficient illumination may be augmented and its contrast preserved by including the lamp 61 in the circuit with the lamp 51, and directing the combined illumination of both these lamps on the object from one side. On the other hand when a solid object is to be illuminated, the contrast in the projected image may be so great if the object is illuminated from one side only that it may be desirable to include in the circuit with the lamp 51, the lamp 10, the illumination from which will soften the shadows and illuminate depressions in the object. If this produces too flat illumination, contrast may be increased by including the lamps 51, 61 and 10 in the circuit together and thus utilizing the illumination from the three lamps simultaneously.

The circuit breakers 71 and 72 each comprise a pair of relatively insulated yielding contact fingers 73 mounted on a base 74 of insulation material and a connecting blade 75 adapted to close the circuit between the fingers. This blade is pivotally mounted on an insulated base 76 so as to be yieldingly movable against a tension spring 77 which normally holds the blade in a relatively upright position owing to the engagement with the base 76 of a stop lug 78 formed on the blade 75. In the present embodiment of the invention, it has been found most convenient to mount the fixed contact finger portions 73 of the circuit breaker 71 on the partition wall 27 of the casing 1, and the contact finger portions 73 of the circuit breaker 72 on the front wall of the casing, while the connecting blade portions 75 of these circuit breakers are mounted on and insulated from the side wall 16 of the reflecting shutter, as shown in Figs. 1, 2 and 4 of the drawings. To cause the circuit between the contact fingers 73 of the circuit breaker established by the blade 75 to be broken quickly and thus prevent undue arcing and burning of the contacts, it is desirable that the blade be withdrawn from between the fingers as quickly as possible during the normal action of the reflecting shutter 14—15, and to this end the blade 75 is pivoted in the base 76 and provided with a tension spring 77 and the contact finger member is provided with a detaining plate 79 having an aperture 93 shown in Fig. 1, and adapted to engage the end of the connecting blade to first detain and then suddenly release the blade as the shutter 14—15 is moved away from the contact fingers 73. When the reflecting shutter 14—15 is in the position shown in Fig. 2 for assuring transparent projection, the circuit breaker 71 is closed and circuit breaker 72 is open, the wiring diagram shown in Fig. 5 corresponding to this condition; and when the shutter is in the position shown in Fig. 4, the circuit breaker 72 is closed and the circuit breaker 71 is open as indicated in the wiring diagram illustrated in Fig. 6.

The electrical connections of the lamps 10, 51 and 61, circuit breakers 71 and 72 and the circuit controlling switch 70 are shown in Figs. 5 and 6, wherein it will be seen that when the circuit breaker 71 is closed as shown in Fig. 5, and the shutter 14—15 is in the position shown in Fig. 2, the lamp 10 alone will be lighted, the circuit breaker 72 meanwhile being open, but when the circuit breaker 72 is closed and the circuit breaker 71 is open, as is the case when the shutter occupies the position shown in Fig. 4, it will be seen from the wiring diagram in Fig.

6 corresponding to this position of the shutter that any combination or all of the lamps 10, 51 and 61 may be lighted depending on the connections established by the switch 70. Although the plus and minus signs have been used in Figs. 5 and 6 to facilitate an understanding of the circuits and paths of the current, it will be understood that these indications do not limit the circuits for use with only unidirectional currents.

When a smaller variety of illuminating effects for the opaque object to be projected than that afforded by the apparatus illustrated in Figs. 1 to 6 inclusive, will suffice, the more compact modified apparatus embodying only two light sources and illustrated in Fig. 7 may be preferred. This apparatus differs from that illustrated in Figs. 1, 2 and 4 chiefly in that it embodies in addition to the front lamp 10 a single auxiliary lamp 90 arranged in the plane of the optical axis of the instrument, instead of the two auxiliary lamps 51 and 61, and in structural details arising out of this difference, such as a narrower lamp house or casing 1ª, the employment of but one circuit breaker 80, the substitution of a single switch 91 for the circuit controlling switch 70, and a somewhat different suspension of the reflecting shutter 14—15, due to the narrower casing; and the spring tension counterbalance for the shutter also is omitted. Thus a longitudinal vertical section of the modified apparatus illustrated in Fig. 7, if taken in the plane of the axis of the transparent and opaque projection systems, would appear very much like either Fig. 2 or 4 of the drawings. If the switch 91 be open this modified apparatus may be operated with the lamp 10 alone in the manner described earlier in this specification in connection with Figs. 1 to 6 inclusive, and if the switch 91 be closed and the entire circuit is complete while the reflecting shutter 14—15 occupies the position shown in Fig. 4 of the drawings, both lamps 10 and 90 will illuminate the opaque object during opaque projection; and the lamp 10 alone will illuminate the transparent projection system during transparent projection because the lamp 90 will be automatically extinguished by the opening of circuit breaker 80 as the reflecting shutter 14—15 is moved into the position shown in Fig. 2 of the drawings.

It will be specially noticed that in either the three-lamp or the two-lamp form of apparatus shown in the drawings, the reflecting portion 14 of the light shutter is arranged off the center of its supporting plate 15, or nearer its forward end, in order to allow the main lamp 10 to be placed as low down and near to the opaque object aperture 5 as possible while also locating the desirably small reflector 14 as closely as possible to both the lamp 10 and the aperture 5, to secure the most brilliant illumination of an opaque object supported by the holder 6.

It will also be understood that so far as concerns the use of a light shutter sustained in any way to be movable about a light source to assure either transparent or opaque object projection, the shutter may or may not have a light reflecting portion, but the shutter reflector enhances the brilliancy of the projected images, and its use is therefore preferred in practice.

Having thus described my invention, what I claim and desire to secure by Letters Patent of the United States is:

1. In an optical projection apparatus, the combination with a casing, of opaque and transparent object holders, an objective in coöperation with each object holder, a plurality of light sources spaced apart and arranged about the opaque object holder, one of said light sources being common to both holders, and controlling means for the light sources whereby one or more may illuminate the opaque object holder.

2. In an optical projection apparatus, the combination with a casing, of a holder for opaque objects on the side of the casing, a plurality of electric lights arranged about and for coöperation with the object holder, a single switch device for selectively controlling either or both of said lights, and an objective for said opaque object holder.

3. In an optical projection apparatus, the combination with a casing, of holders for opaque and transparent objects, objectives for coöperation with each holder, a plurality of electric lights arranged about and for coöperation with the opaque object holder, one of said lights being adapted to illuminate both the transparent and opaque object holders, and a single switch device for selectively controlling said lights.

4. In an optical projection apparatus, the combination with a holder for transparent objects, a holder for opaque objects, two objectives one arranged for coaction with each object holder, and a light source positioned between the two object holders to illuminate either of them, of a pivoted rocking shutter having a light reflecting portion arranged off center nearer its forward end, said shutter being movable on its pivot about the light source from a position between the opaque object holder and its coacting objective, adapting the apparatus for transparent object projection, into a position between the light source and the transparent object holder to adapt the apparatus for opaque object projection.

5. In an optical projection apparatus, the combination with a holder for transparent objects, a holder for opaque objects, and two objectives one arranged for coaction with each of the object holders, of a pivoted rocking shutter having a light reflecting portion arranged off center nearer its forward end, a condensing lens system next to the transparent object holder, a light source behind the condensing lenses in proximity thereto and between which light source and the condensing lenses the shutter may freely rock on its pivot from a position between the opaque object holder and its coacting objective, adapting the apparatus for transparent object projection, into a position between the light source and the transparent object holder to adapt the apparatus for opaque object projection.

6. In an optical projection apparatus, the combination with a holder for transparent objects, a holder for opaque objects, and two objectives one arranged for coaction with each of the object holders, of a main light source arranged between the two object holders, an auxiliary light source located in rear of the main light source out of the light path between the opaque object holder and its objective, and a shutter movable about the main light source from a position between the opaque object holder and its coacting objective into a position between the main light source and the transparent object holder.

7. In an optical projection apparatus, the combination with a holder for transparent objects, a holder for opaque objects, and two objectives one arranged for coaction with each of the object holders, of a main light source arranged between the two object holders, an auxiliary light source located in rear of the opaque object holder, a shutter movable about the main light source from a position between the opaque object holder and its coacting objective into a position between the main light source and the transparent object holder, and electric circuit mechanism automatically controlled by the two respective movements of the light shutter for selectively lighting and extinguishing the main and auxiliary light sources.

8. In an optical projection apparatus, the combination with a holder for transparent objects, a holder for opaque objects, and two objectives one arranged for coaction with each of the object holders, of a main light source arranged between the two object holders, two auxiliary light sources located in rear of the main light source one at each side of the center of the opaque object holder, a shutter movable about the main light source from a position between the opaque object holder and its coacting objective into a position between the main light source and the transparent object holder, and means for selectively lighting and extinguishing the main and auxiliary light sources.

9. In an optical projection apparatus, the combination with a holder for transparent objects, a holder for opaque objects, and two objectives one arranged for coaction with each of the object holders, of a main light source arranged between the two object holders, two auxiliary light sources located in rear of the opaque object holder and at opposite sides thereof and each adapted to throw forwardly and laterally oblique light rays, a shutter movable into and out of a position between the main light source and the transparent object holder, and electric circuit means automatically controlled by the movement of the light shutter in opposite directions for selectively lighting and extinguishing the main light source and the two auxiliary light sources.

10. In an optical projection apparatus, the combination with a holder for transparent objects, a holder for opaque objects, two objectives one arranged for coaction with each object holder, and a light source positioned between the two object holders to illuminate either of them, of an adjustable shutter movable about the light source from a position between the opaque object holder and its coacting objective into a position between the light source and the transparent object holder, means for moving the shutter to either of its two extreme positions, and means counterbalancing the shutter during its two respective movements.

11. In an optical projection apparatus, the combination with a holder for transparent objects, a holder for opaque objects, two objectives one arranged for coaction with each object holder, and a light source positioned between the two object holders to illuminate either of them, of a pivoted rocking shutter movable on its pivot about the light source from a position between the opaque object holder and its coacting objective, adapting the apparatus for transparent object projection, into a position between the light source and the transparent object holder to adapt the apparatus for opaque object projection, means for moving the shutter to either of its two extreme positions, and link, toggle lever, and tension spring devices counterbalancing the shutter during its two respective movements.

12. In an optical projection apparatus, the combination with a holder for transparent objects, a holder for opaque objects, two objectives one arranged for coaction with each object holder, and a light source positioned between the two object holders to illuminate either of them, of a pivoted rocking shutter movable on its pivot about the light source from a position between the opaque object holder and its coacting objective, adapting the apparatus for transparent object projection, into a position between the light source and the transparent object holder to adapt the apparatus for opaque object projection, means for moving the shutter to either of its two extreme positions; link, toggle lever, and tension spring devices counterbalancing the shutter during its two respective movements, and automatic latching means yieldingly holding the counterbalancing devices and the shutter at both extremes of movement of the shutter.

13. In an optical projection apparatus, the combination of two object holders arranged in different planes, a source of light arranged to illuminate both of said object holders, a shutter movable to and from a position between said source of light and one of said object holders, a second source of light adapted to illuminate the other object holder, and means controlled by the movement of said shutter for illuminating said second source of light when moved between said first source of light and the object holder.

14. In an optical projection apparatus, the combination with a casing, of a holder for opaque objects, an objective therefor, a holder for transparent objects fixed relative to the casing, an objective in coöperation with the transparent object holder, a main lamp adapted to illuminate both object holders, means for directing the light rays from the lamp on to the opaque object holder, and a second lamp substantially screened from the transparent object holder but adapted to be inoperative or to illuminate the opaque object holder in addition to the main lamp.

15. In an optical projection apparatus, the combination of a lamp house, two objectives mounted on said lamp house to direct light therefrom, an object holder corresponding to each of said objectives, two lamps in said lamp house arranged to illuminate one of said object holders from different directions, one of said lamps being arranged to illuminate the other object holder alone while the other lamp is extinguished.

16. In an optical projection apparatus, the combination of a lamp house, two objectives mounted on said lamp house to direct light therefrom, an opaque object holder corresponding to one of said objectives, a transparent object holder corresponding to the other of said objectives, two lamps in said lamp house arranged to illuminate said opaque object holder from different directions one of said lamps being arranged to illuminate the transparent object holder alone.

17. In an optical projection apparatus, the combination of a lamp house, two objectives mounted on said lamp house to direct light therefrom, an opaque object holder corresponding to one of said objectives, a transparent object holder corresponding to the other objective, a lamp in said lamp house arranged to illuminate said object holders, and a device in said lamp house adapted to intercept the light between said lamp and said transparent object holder and reflect it to the opaque object holder when in one position but movable out of the path of light from said lamp to said transparent object holder to a position to intercept the path of light from said opaque object holder to its objective.

18. In an optical projection apparatus, the combination of a lamp house, two objectives for directing light therefrom, transparent and opaque object holders corresponding to said objectives, a lamp arranged to illuminate said object holders, and a shutter movable from a position to intercept the path of light from said opaque object holder to its objective to a position to intercept the path of light from said lamp to the transparent object holder and reflect it to the opaque object holder.

19. In an optical projection apparatus, the combination with a holder for opaque objects, of an objective for coöperation therewith, a holder for transparent objects, an objective in coöperation with the transparent object holder, a plurality of lamps spaced apart and on opposite sides of the opaque object holder for coöperation therewith, one of the lamps being remote from the transparent object holder, another of said lamps being fixed relative to the transparent object holder and adapted to emit light rays in one direction onto the opaque object holder, and in another direction for the transparent object holder, and controlling means for operating one or more of said lamps.

20. In an optical projection apparatus, the combination with a lamp house, of holders for opaque and transparent objects, objectives for each holder, a lamp on one side of the opaque object holder for illumination thereof, and a second lamp arranged on another side of the opaque object holder and between the first mentioned lamp and the transparent object holder, said second mentioned lamp being adapted to illuminate both object holders.

21. In an optical projection apparatus, the combination with a lamp house, of holders for opaque and transparent objects, objectives for each holder, a lamp adapted to throw its rays in one direction on the transparent object holder, and in another direction on the opaque object holder, a second lamp disposed on another side and a different distance from the center of the opaque object holder than the first mentioned lamp, and controlling means for said lamps whereby one or more may illuminate the opaque object holder.

22. In an optical projection apparatus, the combination with a casing, of a yieldable holder for opaque objects located in the bottom of the casing, a holder for transparent objects disposed on the side of the casing, a plurality of incandescent lamps located on opposite sides of said opaque object holder with their vertical axes disposed at an acute angle to the holder for opaque objects, circuit connections for operating one or more of said lamps, an objective for each holder, one of said objectives being located adjacent the top of the casing and the other objective being arranged on a side of the casing, and both of said objectives projecting in substantially the same direction, and means located adjacent thereto in coöperation with one of said lamps and adapted to direct the rays of that lamp toward the opaque object holder.

23. In an optical projection apparatus, the combination with a lamp house, of an opaque object holder and a plurality of lamps disposed on different sides thereof, one of the lamps being mounted on a base adjustable relative to the center of the opaque object holder.

24. In an optical projection apparatus, the combination with a lamp house, of an opaque object holder and a plurality of lamps arranged around said object holder for illumination thereof, at least one of the lamps being laterally adjustable.

WILLIAM L. PATTERSON.